United States Patent [19]

Wycoff

[11] Patent Number: 4,644,345
[45] Date of Patent: Feb. 17, 1987

[54] INTERLEAVED DUAL BANK ENCODER

[76] Inventor: Keith H. Wycoff, 1205 N. Tyler St., Lexington, Nebr. 68850

[21] Appl. No.: 518,417

[22] Filed: Jul. 29, 1983

[51] Int. Cl.⁴ .............................................. H04Q 9/12
[52] U.S. Cl. ......................... 340/825.48; 346/825.71
[58] Field of Search ............... 455/38; 340/825.39, 340/825.4, 825.48, 825.71, 825.75, 384 E, 349, 350; 334/56; 370/70, 76, 110.2; 375/48, 62, 63, 48; 331/179; 179/84 VF

[56] References Cited

U.S. PATENT DOCUMENTS

| | | | |
|---|---|---|---|
| 3,597,690 | 8/1971 | Wycoff | 455/38 |
| 3,932,824 | 1/1976 | Wycoff | 334/56 |
| 4,084,138 | 4/1978 | Wycoff | 455/38 |

FOREIGN PATENT DOCUMENTS 472888  6/1975  Australia ..................... 340/825.75

Primary Examiner—Donald J. Yusko
Assistant Examiner—Sharon Hodgkins
Attorney, Agent, or Firm—Emrich & Dithmar

[57] ABSTRACT

There is disclosed an encoder comprising means for generating a plurality of tones with every other tone being in a first bank and the remaining tones being in a second bank. The tones are sequentially combined into a code in which every other tone is from the first bank and the rest of the code tones are from the second bank.

8 Claims, 1 Drawing Figure

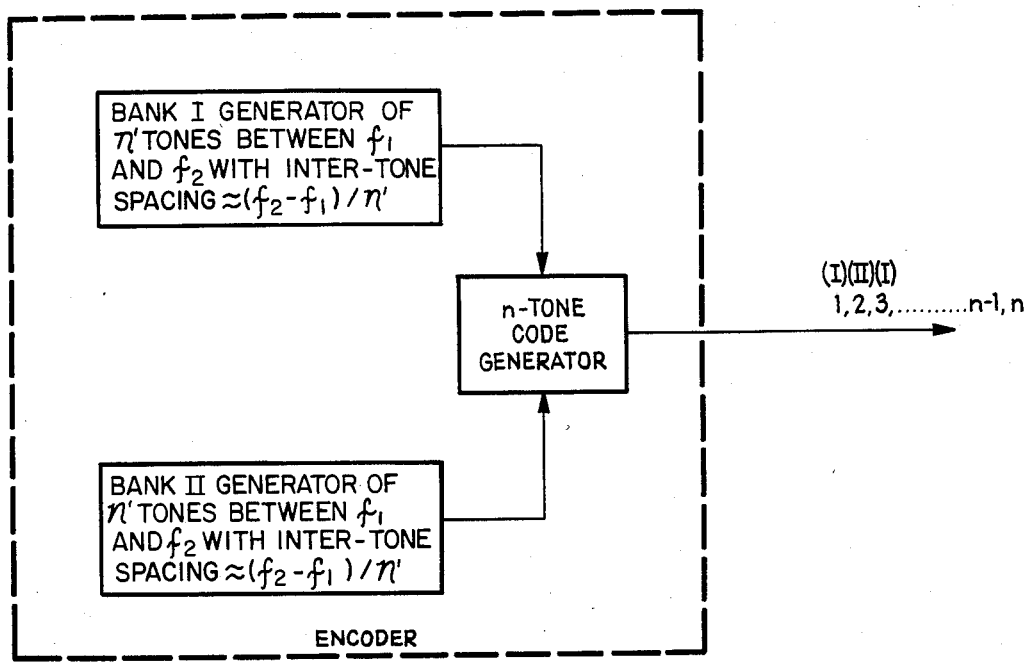

INTERLEAVED DUAL BANK ENCODER

BACKGROUND OF THE INVENTION

A selective call communication system comprises a transmitter and a number of receivers. Each receiver is adapted to intercept the same carrier wave frequency but is responsive to a unique code. Such code may be a sequence of from two to eight tones, depending on the size of the system. The greater the number of tones in the sequence, the greater the number of receivers that can be in the system. The transmitter has associated therewith an encoder which generates the tones and arranges them in the selected sequences.

The most common coding scheme presently being used in selective call communication systems involves ten coding tones and one repeat tone. A repeat tone is necessary in order to accommodate sending of the same tone successively in a code. For example, such a system using five-tone codes does not permit transmission of a code "12334" since it would appear to have only four tones. Instead, in such system, the code "123R4" is sent, signifying that the third tone is repeated. With such a system, the number of codes that can be sent is $10^n$, wherein "n" is the number of tones in each code. In a system involving five-tone codes, 100,000 codes can be generated.

One disadvantage of this kind of coding system is that the coding designations are alphanumeric; whenever a repeat tone is needed, the "R" appears. This makes it difficult for repairmen to readily know the frequency of the tone. Secondly, the number of codes in such a coding scheme is not enough.

An improvement is disclosed in U.S. Pat. No. 3,932,824 in which the inventor is the same as in the present application. There is disclosed a coding system involving two banks of tones. In bank I are ten tones between 1,177 Hz and 1,608 Hz and in bank II are ten tones between 1,988 Hz and 2,704 Hz. Within each bank, the tones are separated by an amount equal to approximately 3.33% of the frequency of the higher tone. The tones in a given code are alternately selected from the two banks. For example, in a system involving five-tone codes, the first, third and fifth slots are filled with tones selected from bank I and the second and fourth slots are filled with tones from bank II. In such a system, numeric coding designations can be utilized exclusively. The code "12334" would mean that the tone in the first slot is tone 1 from bank I, the tone in the second slot is tone 2 from bank II, the tone in the third slot is tone 3 from bank I, the tone in the fourth slot is tone 3 from bank II and the tone in the fifth slot is tone 4 from bank I.

With eleven tones (10 digits plus a repeat) only $10^n$ codes are possible, wherein "n" is the number of tones in sequence in each code. When two banks of ten tones each are utilized, the number of possible codes is doubled to $2 \times 10^n$. For example, in a system involving five-tone codes, the code 12345 in an eleven tone system would signify that tone 1 would be sent in the first slot, tone 2 would be sent in the second slot, tone 3 sent in the third slot and so forth. In a dual-bank system, the same code would mean that the odd slots are filled by tones from bank I and the even slots filled by tones from bank II. The number of codes is doubled because the same code designation could mean that the odd slots are filled with tones from bank II and the even slots with tones from bank I.

While such a system enables numeric coding designations, the spacing between adjacent tones in each bank is too close. For example, in the coding scheme described in U.S. Pat. No. 3,932,824, the spacing between adjacent tones in bank I was between 42 Hz and 55 Hz, while the spacing between the tones in bank II was between 69 Hz and 92 Hz. Also, that coding system involved nonuse of five tones between the two banks.

The closer the tones, the more slowly the decoder in each receiver must operate to avoid falsing. If the tones are very close together frequencywise, the decoder must perform slowly in order to be certain that what it perceives to be a particular tone is indeed that tone rather than the next lower tone or the next higher tone. It takes approximately twice as long to determine which tone is being transmitted when the frequencies are separated by 50 Hz as it does when they are separated by 100 Hz, whether or not the signal is noisy.

Time is particularly important in very large systems. For example, in a system involving 100,000,000 codes, each code would have a sequence of eight tones. If each tone is longer, the code itself is longer and fewer codes can be transmitted per given segment of air time.

It is therefore an important object of the present invention to be able to continue to use a numeric designation for each code while at the same time having greater separation between adjacent tones.

A further object is to double the number of codes available with a given number of tones.

In summary, there is provided an encoder comprising means for generating a plurality of tones of predetermined frequency, every other tone being in a first bank and the remaining tones being in a second bank when the frequencies of the tones are arranged in numerical order, and means for sequentially combining a selected number of tones into a code in which every other tone is from the first bank and in which the rest are from the second bank.

BRIEF DESCRIPTION OF DRAWING

The Figure shows banks I and II and an encoder in block form.

DESCRPITION OF THE PREFERRED EMBODIMENT

According to the present invention, there is provided an encoder which generates two banks of tones, as follows:

| Digit | Bank I | Bank II |
|---|---|---|
| 1 | 358.4 Hz | 460.8 Hz |
| 2 | 563.2 Hz | 665.6 Hz |
| 3 | 768.0 Hz | 870.4 Hz |
| 4 | 972.8 Hz | 1075.2 Hz |
| 5 | 1177.6 Hz | 1280.0 Hz |
| 6 | 1382.4 Hz | 1484.8 Hz |
| 7 | 1587.2 Hz | 1689.6 Hz |
| 8 | 1792.0 Hz | 1894.4 Hz |
| 9 | 1996.8 Hz | 2099.2 Hz |
| 10 | 2201.6 Hz | 2304.0 Hz |

In the above example, every other tone is in bank I and the remaining tones are in bank II when the frequencies of the tones are arranged in numerical order. The encoder generates the code such that every odd slot is filled with a tone from bank I and every even slot is filled with a tone from bank II. A slight adjustment would double the number of codes by changing the coding scheme such that every odd slot is filled with a tone from bank II and every even slot is filled with a tone from bank I. The frequencies given in the above example are by way of illustration. The range of about 350 to about 2,300 fits in with current practice.

Thus, the coding designation "11111" means that the first, third and fifth tones are 358.4 Hz and the second and fourth tones are 460.8 Hz. When reversed, the same coding designation "11111" would mean that the first, third and fifth tones have a frequency of 460.8 and the second and fourth tones have a frequency of 358.4 Hz.

In this scheme, the adjacent tones in each bank are further removed from each other than the system described in U.S. Pat. No. 3,932,824. For example, the tone for digit 6 in bank I is spaced 204.8 Hz from the tones for digits 5 and 7 in that bank. As a matter of fact, the frequency separation throughout banks I and II is 204.8 Hz. That frequency spacing is more than twice the frequency spacing in the '824 patent, enabling response times to be more than twice as fast without sacrificing reliability against falsing.

It is not significant that the tone for digit 5 in bank I is only 102.4 Hz separated from the tone for digit 5 in bank II or the tone for digit 4 in bank II. That is the result of the decoder being programmed to accept or look for tones from only one bank at any instant of time.

I claim:

1. An encoder comprising means for generating a plurality of signals of predetermined frequencies selected alternately from two different banks of frequencies, each bank including a number $n'$ of frequencies lying in a frequency spectrum between a first frequency $f_1$ and a second frequency $f_2$ with the frequency difference between adjacent frequencies in each bank being substantially $(f_2 - f_1)/n'$.

2. The encoder of claim 1, wherein the frequency of the first tone in the first bank is 358.4 Hz, the frequency of the last tone in the first bank is 2,201.6 Hz., the frequency of the first tone in the second bank is 460.8 Hz., and the frequency of the last tone in the second bank is 2,304.0 Hz.

3. The encoder of claim 1 wherein the frequency difference between the tones in the first bank is substantially constant.

4. The encoder of claim 3, wherein the frequency difference is 204.8 Hz.

5. The encoder of claim 1, wherein the frequency difference between the tones in the second bank is substantially constant.

6. The encoder of claim 5, wherein the frequency difference between the tones in the second bank is 204.8 Hz.

7. The encoder of claim 1, wherein the frequency difference between the tones in each of the banks is substantially equal and constant.

8. The encoder of claim 1, wherein except for the lowest frequency of the tones in bank 1 and the highest frequency of the tones in bank 11, each tone in each bank is immediately adjacent two tones in the other bank.

* * * * *